United States Patent [19]

Derudder et al.

[11] Patent Number: 4,939,205

[45] Date of Patent: Jul. 3, 1990

[54] THERMOPLASTIC MOLDING COMPOSITIONS CONTAINING POLYORGANOSILOXANE/POLYVINYL-BASED GRAFT POLYMER MODIFIERS

[75] Inventors: James L. Derudder, Mt. Vernon, Ind.; Frank J. Traver, Troy, N.Y.; I-Chung W. Wang, Williamstown, Mass.

[73] Assignee: General Electric Company, Parkersburg, W. Va.

[21] Appl. No.: 271,223

[22] Filed: Nov. 14, 1988

[51] Int. Cl.$^5$ .............................................. C08L 51/08
[52] U.S. Cl. ...................................... 525/63; 525/262; 525/267; 525/403
[58] Field of Search ................... 525/63, 267, 262, 403

[56] References Cited

U.S. PATENT DOCUMENTS

| | | | |
|---|---|---|---|
| 3,220,972 | 11/1965 | Lamoreaux | 260/46.5 |
| 3,775,452 | 11/1973 | Karstedt | 260/429 |
| 4,556,705 | 12/1985 | McCready | 528/289 |

FOREIGN PATENT DOCUMENTS 0249964 12/1987 European Pat. Off. .
1590549  6/1981 United Kingdom .

*Primary Examiner*—Melvyn I. Marquis
*Attorney, Agent, or Firm*—Hedman, Gibson, Costigan & Hoare

[57] ABSTRACT

Thermoplastic molding compositions are provided which comprise a polycarbonate resin alone or in combination with a saturated polyester resin and/or a poly(etherester) elastomer, a poly(etherimide ester) elastomer or a mixture thereof; a polyphenylene ether resin and a saturated polyester resin; a polyphenylene ether resin, a saturated polyester resin and a polycarbonate resin; or mixtures thereof modified with multistage polyorganosiloxane/polyvinyl-based graft polymers which exhibit markedly improved impact strength and weld line strength with no tendency to delaminate or to show mottled surfaces after molding.

53 Claims, No Drawings

THERMOPLASTIC MOLDING COMPOSITIONS CONTAINING POLYORGANOSILOXANE/POLYVINYL-BASED GRAFT POLYMER MODIFIERS

CROSS REFERENCE TO RELATED APPLICATIONS

This application is related to the following commonly owned, concurrently-filed U.S. patent applications:

FIELD OF THE INVENTION

The invention related to thermoplastic molding compositions, comprising a polycarbonate resin alone; mixtures of a polycarbonate resin and a saturated polyester resin and/or a poly(etherester) elastomer, a poly(etherimide ester) elastomer or a mixture thereof; a polyphenylene ether resin and a saturated polyester resin; a polyphenylene ether resin, a saturated polyester resin and a polycarbonate resin; or mixtures thereof and a polyorganosiloxane/polyvinyl-based graft polymer modifier and optionally a flame-retardant amount of platinum or a platinum compound, which exhibit enhanced impact strength, particularly at low temperatures, while maintaining particularly weld line strength, good surface appearance, and other desirable properties without showing any tendency to delaminate.

BACKGROUND OF THE INVENTION

Polycarbonate resin compositions and blends with other thermoplastic resins are widely used because of their excellent properties. Polycarbonate resin compositions and mixtures thereof with a saturated polyester and/or a polyester elastomer are described, for example, in European patent application No. 249,964. It is disclosed therein that very desirable improvements in chemical resistance, weather resistance and low temperature impact resistance are achieved if an additive comprising a silicone-based graft copolymer is used. In particular, there is used a modifier comprising a silicone rubber onto which a styrene/acrylonitrile co-monomer is grafted in the presence of a graft-linking agent. Such modifiers have relatively poor rubber integrity and incompatibility with the resins, and this may lead to poor surface appearance in the molded articles. Also relevant for its broad teachings is BASF's U.K. Patent No. 1,590,549 which also describes a silicone rubber graft polymer impact modifier for thermoplastics; poor compatibility is also observed with these compositions.

A novel polyorganosiloxane/polyvinyl-based graft polymer has now been discovered to be extremely useful as a modifier for such thermoplastic resins, and it does not show any tendency to cause delamination or surface mottling.

In the present invention, the polyorganosiloxane rubber substrate of the prior art is replaced by a co-homopolymerized network(s) of polyorganosiloxane/polyvinyl-based polymer(s) in a co-homopolymerization process. Polyorganosiloxane/polystyrene-based co-homopolymers are particularly preferred for use in the first stage of the graft polymers used in the present invention. The present invention uses graft polymers provided by subsequent graft polymerization of vinyl monomers (e.g., poly(methyl methacrylate), polystyrene or styrene/acrylonitrile copolymer) onto the polyorganosiloxane/polyvinyl co-homopolymer substrate as described.

This multi-stage graft polymer is usefully employed in the present invention as a superior impact strength modifier for thermoplastic molding compositions comprising polycarbonates and mixtures thereof with polyesters and/or poly(etherester) elastomers, poly(etherimide ester) elastomers or mixtures thereof; mixtures of polycarbonates, polyphenylene ethers, and polyesters; mixtures of polyphenylene ethers and polyesters; or mixtures of any of the foregoing. They maintain many unique features of silicone rubber, such as enhanced impact strength particularly at low temperature, and weld line strength, while maintaining other properties such as thermal resistance, but show no indication of delamination or mottled surfaces.

SUMMARY OF THE INVENTION

According to the present invention, there are provided thermoplastic molding compositions comprising a polycarbonate resin (A); a mixture (A-1) comprising (i) a polycarbonate resin and (ii) a saturated polyester resin; a mixture (A-2) comprising (i) a polycarbonate resin and (iii) a poly(etherester) elastomer, a poly(etherimide ester) elastomer, or a mixture thereof; a mixture (A-3) comprising (i) a polycarbonate resin, (ii) a saturated polyester resin and (iii) a poly(etherester) elastomer, a poly(etherimide ester) elastomer, or a mixture thereof; a mixture (A-4) comprising (ii) a saturated polyester resin and (iv) a polyphenylene ether resin; a mixture (A-5) comprising (i) a polycarbonate resin, (ii) a saturated polyester resin and (iv) a polyphenylene ether resin; or a mixture (A-6) of any of the foregoing; and an effective modifying amount of a multi-stage polyorganosiloxane/polyvinyl-based graft polymer composition (B) comprising: (a) as a first stage, a polymeric co-homopolymerized substrate comprised of, in combination, an organosiloxane polymer; at least one vinyl-based polymer; and optionally units derived from a cross-linking agent or agents; units which serve as a graft-linking agent or agents; units derived from a cross-linking agent or agents and units from the same or different agent or agents which serve as a graft-linking agent or agents, or a mixture of any of the foregoing units; and (b) at least one subsequent stage or stages graft polymerized in the presence of any previous stage(s) and which is comprised of a vinyl-based polymer.

Also contemplated by the invention are compositions as above defined wherein said subsequent stages comprise (b)(i) a second stage comprising at least one vinyl polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (b)(ii) a third stage comprising at least one vinyl-based polymer which is the same as, or different than, said (b)(i) polymer.

DETAILED DESCRIPTION OF THE INVENTION

The polycarbonate resin (A) or (i) in the invention is produced by using a dihydroxydiarylalkane as the main starting material and optionally has branched chains. Such polycarbonate resins are manufactured by known processes and generally by the reaction of a dihydroxy compound and/or a polyhydroxy compound with either phsogene or a diester of carbonic acid. Suitable dihydroxydiarylalkanes include those having at least one alkyl group, chlorine, atom, or bromine atom in any of the positions ortho to the hydroxyl groups. Preferred examples of the dihydroxydiarylalkane include 4,4'-dihydroxy-2,2-diphenylpropane(bisphenol-A); tetramethylbisphenol-A; and bis-(4-hydroxyphenyl)-p-diisopropylbenzene. The branched polycarbonate resin can be produced by the above-mentioned reaction but using, for example, 0.2 to 2 mole percent of a polyhydroxy compound in place of a part of the dihydroxy compound. Examples of the polyhydroxy compound include 1,4-bis-(4',4,2-dihydroxytriphenylmethyl)-benzene; phloroglucinol; 4,6-dimethyl-2,4,6-tris-(4-hydroxyphenyl)-heptene-2; 4,6-dimethyl-2,4,6-tris-(4-hydroxyphenyl)-heptane, 1,3,5-tris-(4-hydroxyphenyl)-benzene; 1,1,1-tris(4-hydroxyphenyl)-ethane; and 2,2-bis-(4,4-(4,4'-dihydroxyphenyl)-cyclohexyl)propane. Particularly preferred polycarbonate resins are of the bisphenol-A type.

The saturated polyester resin (ii) can be derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

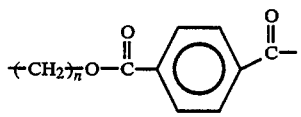

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

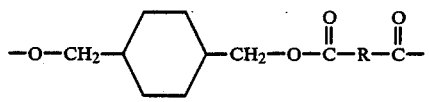

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl) ethane, 4,4'-dicarboxyldiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

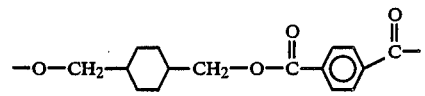

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

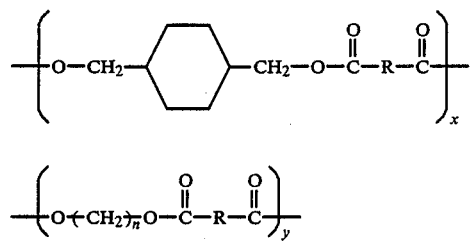

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

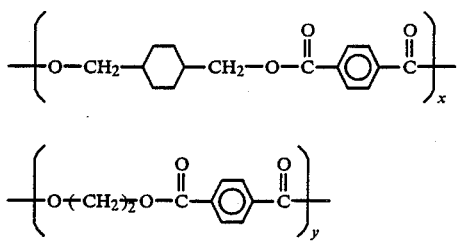

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture of similar solvent at 23°-30° C.

The poly(etherester) elastomer (iii) for use as a component in the invention is a block copolymer consisting of polyester segments and polyether segments having molecular weights of 400 to 20,000. The polyester segment consists of a polyester obtained by condensation of an aromatic dicarboxylic acid with an alkylene glycol. Examples of this segment are as cited above in the case of the saturated polyester. Preferred examples of this segment are poly(1,4-butylene terephthalate) and poly(ethylene terephthalate). On the other hand, the polyether segment consists of a polyalkylene ether glycol, e.g. poly(ethylene oxide) glycol, poly(tetramethylene oxide) glycol, poly(propylene oxide) glycol, or a mixture thereof; an aliphatic polyester, e.g. a polyester resulting from the reaction of an aliphatic dicarboxylic acid of 2 to 12 carbon atoms with an aliphatic glycol of 2 to 10 carbon atoms, more specifically, polyethylene adipate, polytetramethylene adipate, polyethylene sebacate, polyneopentyl sebacate, polyhexamethylene azelate, or poly--caprolactone. The content of the polyether segment in the poly(etherester) elastomer is preferably from 2 to 80 percent by weight.

The poly(etherimide ester) elastomers (iii) used herein may be prepared from one or more diols, one or more dicarboxylic acids and one or more high molecular weight polyoxyalkylene diimide diacids. Preparation of such materials is described in detail in U.S. Pat. No. 4,556,705 of R. J. McCready, issued Dec. 3, 1985, and hereby incorporated by reference.

The poly(etherimide ester) elastomer used herein may be prepared by conventional processes, such as esterification and condensation reactions for the production of polyesters, to provide random or block copolymers. Thus, poly(etherimide esters) may be generally characterized as the reaction product of the aforementioned diols and acids.

The polyphenylene ether resin (iv) in the invention is a homopolymer or copolymer represented by the formula

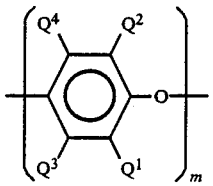

wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether. Particularly preferred is a poly(2,6-dimethyl-1,4-phenylene)ether resin. There is no particular restriction on the polymerization degree of the polyphenylene ether resin used in the invention, but it is preferable to use the resin having a reduced viscosity of 0.3 to 0.7 dl/g measured in chloroform at 25° C. Resins having a less reduced viscosity than 0.3 dl/g tend to exhibit low heat stability while resins having a reduced viscosity exceeding 0.7 dl/g tend to have inferior moldability.

The multi-stage graft polymer of the present invention is made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced, each retaining its own structure.

The co-homopolymerization process provides two discrete networks rather than a random copolymer. While not intending to be bound by any theory, it is possible that the network(s) comprises two or more distinct interpenetrating polymer phases which provides the additional strength needed in the polyorganosiloxane. This is evidenced by the two distinct glass transition temperatures which can be detected by differential scanning calorimetry (DSC). Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/-polyvinyl-based graft polymers of the invention.

The subsequent graft polymerization is preferably of at least one vinyl aromatic type monomer. It has been found that styrene/acrylonitrile copolymer or an alkyl (meth)acrylate is particularly effective as the second stage graft polymer or copolymer, or as the outer most stage when intermediary stages are optionally utilized.

The foregoing polyorganosiloxane/polyvinyl-based graft polymer can be isolated and utilized as, for example, an impact strength modifying agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and vinyl-based monomer(s) are premixed with water and suitable cross-linker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks under a nitrogen blanket. Heat is applied to facilitate the reaction. For typical 5 to 50 gallon stainless steel reactors, a 3 to 6 hour residence time at 75° C. to 90° C. is adequate to complete the co-homopolymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/-polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be an organic soluble radical initiator, such as azobisisobutyronitrile (AIBN) and the organic peroxides, e.g. benzoyl peroxide, dichloro benzoyl peroxide, tert-butyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft, polymerization of additional vinyl-functional moieties onto graft sites provided by the rubbery substrate particles in the latex formed in the first stage. Subsequent additional stages are optional but may be preferred for certain applications.

The grafted polymers will preferably be the product of a vinyl polymerization process. Suitable vinyl monomers for graft polymerization include without limitation: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide, N-phenyl (or alkyl) maleimide; and mixtures of these monomers.

The vinyl polymerization is accomplished in an emulsion; therefore, water soluble initiators are suitable, e.g., potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized rubbery substrate comprised of a polyorganosiloxane/polyvinyl-based substrate. This substrate may have sufficient grafting sites for a second or subsequent stage to be grafted thereto. Grafted polystyrene, poly(meth)acrylate, or stryene/acrylonitrile copolymer as the outermost stage is preferred, yet many other intermediary stages such as a butyl acrylate stage are also contemplated. Furthermore, the grafting of additional stages of the same or different kinds is also possible.

In general, the first stage substrate comprising the co-homopolymerized polyorganosiloxane/polyvinyl-based substrate will comprise approximately 5 to 95 weight percent of the total graft polymer based upon the weight of the first stage substrate and the subsequent stage or stages taken together. Preferably, the first stage substrate will comprise approximately 30 to 90 weight percent on the same basis. Correspondingly, the subsequent stages, comprising the additional grafted vinyl polymer, will comprise approximately 95 to 5 weight percent and preferably approximately 70 to 10 weight percent on the same basis. In the multi-stage systems, preferably, the ratio of first stage substrate polymer (B)(a) to second stage polymer (b)(i) is 10:90 to 90:10 and the amount of third stage polymer (b)(ii) comprises from about 10 to about 90 parts by weight per 100 parts by weight of (B)(a), (b)(i), and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula

wherein R is hydrogen or a monovalent hydrocarbon radical of about 1 to 16 carbon atoms and n is 0, 1 or 2.

Preferred among the organosiloxanes are those in cyclic form having three or more siloxane units, and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butyl-acrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene, vinylimidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth)acrylate, triallyl isocyanurate, ethylene di(meth)acrylate, butylene di(meth)acrylate, diallyl maleate, maleic anhydride; maleimide compounds such as maleimide or N-phenyl (or alkyl) maleimides, acrylamides, N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl component will comprise approximately 5 to 45 weight percent of the first stage of the co-homopolymerized substrate.

The cross-linker composition used in conjunction with the organosiloxane component of the present compositions can have the general formula

wherein n is 0, 1, or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

The amounts of components (A), (A-1), (A-2), (A-3), (A-4), (A-5) or (A-6) and (B) can vary broadly, but will usually be in the range of from about 1 to about 99 parts by weight of (A), (A-1), (A-2), (A-3), (A-4), (A-5) or (A-6) to from about 99 to about 1 part by weight of (B), per 100 parts by weight of (A), (A-1), (A-2), (A-3), (A-4), (A-5) or (A-6) and (B) together. Preferably (A), (A-1), (A-2), (A-3), (A-4), (A-5) or (A-6) comprises from about 99 to about 37 parts by weight and (B) comprises from about 1 to about 63 parts by weight.

In a preferred feature of the invention, platinum or platinum compounds are utilized in conjunction with polyorganosiloxane compositions in order to enhance the flame retardance of the latter. As flame retarding additives, there may be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The compositions can also be further rendered more flame retardant with effective amounts, e.g., between about 1 and 30 parts by weight per 100 parts by weight of resin, of a flame retardant agent as component (C), e.g., elementary red phosphorous, phosphorous compounds, halogen compounds, nitrogen compounds, antimony oxide, zinc oxide, metal salt(s) of sulfonated diphenylsulfone, metal salt(s) of trichlorobenzenesulfonic acid, mixtures thereof and the like.

In addition, reinforcing fillers as component (D); dyes and colored pigments; heat stabilizers; thermooxidative stabilizers and UV stabilizers; waxes, lubricants and processing assistants which ensure trouble-free extrusion and injection molding; and antistatic agents may be added to the molding compositions according to the invention.

The reinforcing filler (D) can be comprised of any organic or inorganic fillers including but not limited to glass fiber, carbon fiber, aramid fiber, metallic fiber, glass beads, glass flakes, calcium carbonate, talc, mica, aluminum oxide, boron nitride, calcium silicate, clay or metal powders or whiskers.

Conventional processes for mixing thermoplastic polymers can be used for the manufacture of molding compositions within the invention. For example, the compositions can be manufactured by using any suitable mixing equipment, e.g., cokneaders or extruders. The mixing temperatures are in general from 150° to 370° C., preferably from 200° to 345° C. The polymers are fused and thoroughly mixed, with or without the other additives described.

The addition of the graft polymers described above does not adversely influence the processing stability of the thermoplastically processable plastics material. The processing of the new molding compositions by extrusion or injection molding is preferably carried out at from 200° to 345° C., with the mold, in the latter case, being at from 50° to 150° C.

DESCRIPTION OF THE PREFERRED EMBODIMENTS

The following examples illustrate the invention without limitation. All parts given are by weight unless otherwise indicated. Impact strengths are reported as notched Izod (NI) according to ASTM D-256 at 23° C. (r.t.) unless otherwise specified, Charpy NI in a falling weight test to define ductile/brittle transition temperatures (D/B). Weld line strength (DG) is measured on unnotched Izod bars molded in a double-gated mold. Flame resistance is reported as maximum and average flame-out-time and UL-94 rating (Underwriter's Laboratory Bulletin 94). Surface gloss, 60° is measured by ASTM D-523, and yellowness is reported as Yellowness Index (YI).

A single slash is used between monomers of a single stage and a double slash or a hyphen is used as a shorthand method of indicating separation between stages. The first stage to be polymerized is written before the double slash or hyphen and subsequent stages are written subsequently.

The following abbreviations are used in accordance with the following Tables in the following Examples:
Si=general term for organosiloxanes include D4, VMD4, VTMOS, TEOS, APTMOS, etc.
D4=octamethylcyclotetrasiloxane
VMD4=tetravinyltetramethylcyclotetrasiloxane
VTMOS=vinyltrimethoxysilane
TEOS=tetraethoxysilane
APTMOS=gamma-methacryloxypropyltrimethoxysilane
S=styrene
PS=polystyrene
AN=acrylonitrile
BA=n-butyl acrylate
DAM=diallyl maleate
DVB=divinylbenzene
BDA=1,3-butylene diacrylate
MMA=methyl methacrylate

PROCEDURE A

Octamethylcyclotetrasiloxane (D4) 90 parts, tetravinyltetramethylcyclotetrasiloxane (VMD4) 10 parts, siloxane derived cross- and graft-linkers, tetraethoxysilane (TEOS) 1.7 parts, and gamma-methacryloxypropyltrimethoxysilane (APTMOS) 1.43 parts, and an optional chloroplatinic acid catalyst solution containing 35,000 ppm platinum prepared in accordance with U.S. Pat. No. 3,220,972, 0.097 part, are mixed and are added to a styrenic mixture composed of styrene 33 parts, and divinylbenzene 0.67 part. An organic soluble radical initiator may be added in the styrenic mixture at this stage or a water soluble initiator may be batchwise or incrementally added to the post homogenization latex during the later stage of co-homopolymerization. The final organic mixtures are then added to an aqueous solution containing dodecylbenzenesulfonic acid, 1.33 parts per 400 parts deionized water, which is then emulsified by passing twice through a homogenizer at 4000–8000 psi. The resulting pre-emulsified latex is then heated up to and polymerized at 75°–90° C. for six hours before being quenched by the addition of a neutralizing agent. The resultant S/AN comonomer of 75:25 ratio, 30 or 50 parts based on the 70 or 50 parts of the dry silicone/polystyrene rubber substrate in the latex form, is then grafted to the substrate at 75° C. over a 3 to 6 hour period. A white grainy powder is isolated after flocculation in a hot salt containing aqueous solution.

PROCEDURE B

The first stage production of the silicone/polystyrene rubber substrate is the same as described in Procedure A. At the second stage, one stream containing butyl acrylate, butylene glycol diacrylate, diallyl maleate, deionized water and sodium dodecylbenzenesulfonate and concurrently another aqueous stream consisting of a water soluble initiator, potassium persulfate, is added to the silicone/polystyrene co-homopolymer over a period of 1 to 3 hours at 75° C. The butyl acrylate to the dry silicone/polystyrene-based rubber substrate weight ratio is sought to comprise 35:35. The S/AN grafting procedure from Procedure A is repeated as are the isolation steps.

PROCEDURE C 79.1 parts of octamethylcyclotetrasiloxane, 9.8 parts of tetraethoxysilane, 2.3 parts of gammamethacryloxypropyltrimethoxysilane, and 8.8 parts of 2,4,6,8-tetramethyltetravinylcyclotetrasiloxane are mixed to form Solution 1. 4.9 parts of styrene and 0.1 part divinylbenzene are mixed to form Solution 2. 1.00 part of dodecylbenzenesulfonic acid is dissolved in 300 parts of deionized water to form Solution 3. 0.025 part of potassium persulfate is dissolved in 1.25 parts of deionized water to form Solution 4. Solutions 1 and 2 are admixed and stirred for 30 minutes. The resultant mixture is added to Solution 3, stirred well, and homogenized in two stages at 6500 psi. The latex is transferred to a reactor equipped with an overhead stirrer, a condenser, an argon sparge tube, an addition funnel, and a thermometer with a temperature controller. A continuous stream of argon gas is bubbled through the latex for 30 minutes with constant stirring. The temperature is raised to 75° C. under an argon blanket and left stirring at 75° C. for 15 minutes. Solution 4 is added dropwise to the latex over a one hour period, and particle size and solid content measurements are monitored every hour throughout the course of polymerization. The heat is removed after six hours, but stirring is continued under an argon blanket overnight. The latex is titrated to pH 8.5 with an aqueous potassium carbonate solution ($K_2CO_3$). Fifteen minutes later, 30 parts of methyl methacrylate based on 70 parts of the dry silicone/polystyrene-based, rubber substrate in the latex form, is then grafted to the substrate at 75° C. over a 3 to 6 hour period and yields the CSiM modifier (Si/PS)-MMA wt. ratio of 70:30.

PROCEDURE D

The method of Procedure C is followed except 30 parts of styrene is substituted for the 30 parts of methyl methacrylate in the final grafting stage. This yields the CSiM modifier (Si/PS)-S wt. ratio of 70:30.

PROCEDURE E

The method of Procedure C is followed except 30 parts of S/AN wt. ratio of 75:25 is substituted for the 30 parts of methyl methacrylate in the final grafting stage. This yields the CSiM modifier (Si/PS)-S/AN wt. ratio of 70:30.

PROCEDURE F 27 parts of 1,4-butanediol, 34 parts of dimethyl terephthalate and 39 parts of polyoxyalkylene diimide diacid prepared by the imidization of trimellitic anhydride and a propylene ether diamine are reacted to yield a poly(etherimide ester) copolymer.

EXAMPLE 1

A dry blend of 95 parts of polycarbonate resin (Lexan® 141 General Electric Company), 5 parts of CSiM modifier ((Silicone (Si)/Polystyrene (PS))-S/AN wt. ratio of 70:30) prepared by the method of Procedure A and 0.3 part of potassium salt of monosulfonated diphenylsulfone (KSS) is tumble mixed in a jar shaker to give a homogeneous dispersion. The well mixed dry mixture is then extruded on a Werner Pfleiderer 30 mm twin screw extruder under the normal operation conditions for polycarbonate. The dry, pelletized extrudate is then injection molded on a 75-ton Newbury molding machine. Izod bars are tested by ASTM Test Method No. D-256, and flammability is tested according to the Underwriter's Laboratory guidelines. The parts do not delaminate, and there is no surface mottling. Properties are summarized in Table 1.

EXAMPLE 2

The procedure of Example 1 is followed substituting a dry blend of 95 parts of polycarbonate (Lexan® 141), 5 parts of CSiM modifier ((Si/PS)-S/AN wt. ratio of 70:30) prepared by the method of Procedure A, and 0.3 part of sodium salt of trichlorobenzenesulfonic acid (STB). The parts do not delaminate, and there is no surface mottling. Properties are summarized in Table 1.

EXAMPLE 3

The procedure of Example 1 is followed substituting a dry blend of 93 parts of polycarbonate (Lexan® 141), 7 parts of CSiM modifier ((Si/PS)-S/AN wt. ratio of 50:50) prepared by the method of Procedure A, and 0.3 part of KSS. The parts do not delaminate, and there is no surface mottling. Properties are summarized in Table 1.

EXAMPLE 4

The procedure of Example 1 is followed substituting a dry blend of 93 parts of polycarbonate (Lexan® 141), 7 parts of CSiM modifier ((Si/PS)-S/AN wt. ratio of 50:50) prepared by the method of Procedure A, and 0.3 part of STB. The parts do not delaminate, and there is no surface mottling. Properties are summarized in Table 1.

COMPARATIVE EXAMPLE 4A

The procedure of Example 1 is followed substituting for the dry blend, 100 parts, of polycarbonate (Lexan® 141) and omitting the modifier. Properties are summarized in Table 1.

COMPARATIVE EXAMPLE 4B

The procedure of Example 1 is followed substituting a dry blend of 100 parts of polycarbonate (Lexan® 141) and 0.3 part of KSS. Properties are summarized in Table 1.

Non-marbling, high impact, flame resistant blends of polycarbonate are obtained by the addition of specifically designed CSiM emulsion polymers. Examples 1–4 when compared with Comparative Examples 4A and 4B indicate that the CSiM modified polycarbonates possess thick-sectioned impact strength and low temperature ductility. The addition of CSiM to blends including KSS or STB also result in improved flame resistance.

TABLE 1

| High Impact and Flame Resistant Polycarbonate/CSiM Blends | | | | | | |
|---|---|---|---|---|---|---|
| Example | 1 | 2 | 3 | 4 | 4A | 4B |
| Polycarbonate Resin[1] | 95 | 95 | 93 | 93 | 100 | 100 |
| CSiM* | 5 | 5 | — | — | — | — |
| CSiM** | — | — | 7 | 7 | — | — |
| KSS+ | .3 | — | .3 | — | — | .3 |
| STB++ | — | .3 | — | .3 | — | — |
| UL-94 .125" | V0 | V0 | V0 | V0 | Burns | V0 |
| Flame-Out-Time (Sec.) | | | | | | |
| Max. | 6.2 | 6.5 | 3.2 | 7.5 | 46.0 | 6.0 |
| Avg. | 2.8 | 2.2 | 2.0 | 2.0 | 22.5 | 2.8 |
| NI @ r.t. (ft-lbs/in) | | | | | | |
| .125" | 13.5 | 13.8 | 14.3 | 14.3 | 15.2 | 15.7 |
| .250" | 11.2 | 10.7 | 12.1 | 9.3 | 2.1 | 2.0 |
| Charpy NI (.125", ft-lbs/in) | — | 13.4 | 13.4 | 12.9 | — | — |
| r.t. | | | | | | |
| 5° C. | — | — | — | — | — | 13.7 |
| 0 | — | — | — | — | — | 9.4 |
| −5 | 11.2 | — | — | — | — | — |
| −10 | — | — | — | 11.4 | — | — |
| −15 | — | — | 11.8 | 7.5 | — | 1.6 |
| −20 | — | 10.2 | — | — | — | — |
| −25 | 9.6 | — | 11.7 | 4.1 | — | 2.1 |
| −30 | — | 5.7 | 8.5 | — | — | — |
| −35 | — | 3.9 | 4.2 | 2.8 | — | 1.6 |
| −40 | 4.5 | — | — | — | — | — |
| −45 | — | — | 3.2 | — | — | — |
| D/B °C. | −27 | −27 | −30 | −15 | — | −5 |

[1]Lexan ® 141, poly(bisphenol-A carbonate), General Electric Company
*(Si/PS)-S/AN wt. ratio of 70:30, Procedure A
**(Si/PS)-S/AN wt. ratio of 50:50, Procedure A
+Potassium salt of monosulfonated diphenylsulfone
++Sodium salt of trichlorobenzenesulfonic acid

EXAMPLE 5

The procedure of Example 1 is followed substituting a dry blend of 98 parts of polycarbonate (Lexan® 141), 2 parts of CSiM modifier ((Si/PS)-S/AN wt. ratio of 70:30) prepared by the method of Procedure A, and 0.3 part of KSS. The parts do not delaminate, and there is no surface mottling Properties are summarized in Table 2.

EXAMPLE 6

The procedure of Example 1 is followed substituting a dry blend of 97 parts of polycarbonate (Lexan® 141), 3 parts of CSiM modifier ((Si/PS)-S/AN wt. ratio of 70:30) prepared by the method of Procedure A, and 0.3 part of KSS. The parts do not delaminate, and there is no surface mottling. Properties are summarized in Table 2.

EXAMPLE 7

The procedure of Example 1 is followed substituting a dry blend of 96 parts of polycarbonate (Lexan® 141), 4 parts of CSiM modifier (Si/PS)-S/AN wt. ratio of 70:30) prepared by the method of Procedure A, and 0.3 part of KSS. The parts do not delaminate, and there is no surface mottling. Properties are summarized in Table 2.

EXAMPLE 8

The procedure of Example 1 is followed substituting a dry blend of 95 parts of polycarbonate (Lexan® 141), 5 parts of CSiM modifier ((Si/PS)-S/AN wt. ratio of 70:30) prepared by the method of Procedure A, and 0.3 part of KSS. The parts do not delaminate, and there is no surface mottling. Properties are summarized in Table 2.

COMPARATIVE EXAMPLE 8A

The procedure of Example 1 is followed substituting a dry blend of 100 parts of polycarbonate (Lexan ® 141) and 0.3 part of KSS. Properties are illustrated in Table 2.

COMPARATIVE EXAMPLE 8B

The procedure of Example 8 is repeated substituting as an impact modifier, GSiM prepared by the method of Procedure A, but omitting the styrenic network from the first stage substrate.

Table 2 illustrates that the degree of low temperature ductility and the notch insentivity of 0.250" impact strength are dependent upon the concentration of the silicone/polystyrene-based graft polymer incorporated into the blend. Example 5 when compared with Comparative Example 8A demonstrates that as little as 2 wt. percent of CSiM is effective in improving the above properties. It should be noted that if polystyrene is omitted from the substrate (Comparative Example 8B), double-gate weld line strength is reduced substantially in comparison with the corresponding composition where polystyrene is present in the substrate (Example 8).

TABLE 2

| Compositions Comprising Polycarbonate/CSiM | | | | | | |
|---|---|---|---|---|---|---|
| Example | 5 | 6 | 7 | 8 | 8A | 8B |
| Polycaronate Resin[1] | 98 | 97 | 96 | 95 | 100 | 95 |
| KSS* | .3 | .3 | .3 | .3 | .3 | .3 |
| CSiM** | 2 | 3 | 4 | 5 | — | — |
| GSiM*** | — | — | — | — | — | 5 |
| DG .125" (ft-lbs/in.) | NB | 34 | 34 | 34 | 37.3 | 26 |
| NI @ r.t. .250" (ft.-lbs/in.) | 5.5 | 11.7 | 12.4 | 12.3 | 2.0 | 11.6 |
| Charpy NI .125" (ft.-lbs/in.) r.t. | 15.7 | 14.5 | 12.1 | 11.7 | — | — |
| 5° C. | — | — | — | — | 13.7 | — |
| 0 | 14.8 | — | — | — | 9.4 | — |
| −10 | 7.5 | — | — | — | 1.6 | — |
| −20 | 4.3 | 9.9 | 10.6 | 10.0 | 2.1 | — |
| −30 | 3.2 | 4.5 | 5.5 | 7.1 | 1.6 | — |
| −40 | 1.8 | 3.6 | 5.3 | 4.4 | — | — |
| −50 | — | 2.6 | 2.6 | 4.3 | — | — |
| D/B °C. | −10 | −20 | −22 | −30 | −5 | — |

[1]Lexan ® 141, poly(bisphenol-A carbonate), General Electric Company
*Potassium salt of monosulfonated diphenylsulfone.
**(Si/PS)-S/AN wt. ratio of 70:30, Procedure A
***Si-S/AN wt. ratio of 70:30, Procedure A, but without the styrenic network in first stage substrate

EXAMPLE 9

The procedure of Example 1 is followed substituting a dry blend of 90 parts of polycarbonate (Lexan ® 141), 10 parts of CSiM modifier ((Si/PS)-BA-S/AN wt. ratio of 35:35:30) prepared by the method of Procedure B without the optional platinum catalyst added, and 0.3 part of KSS. The parts do not delaminate, and there is no surface mottling. Properties are summarized in Table 3.

COMPARATIVE EXAMPLE 9A

The procedure of Example 1 is followed substituting a dry blend of 90 parts of polycarbonate (Lexan ® 141), 10 parts of KM 643 (Acryloid ®, Rohm & Haas Company) polybutadiene first stage/poly(methyl methacrylate) second stage impact modifier, and 0.3 part of KSS. Properties are summarized in Table 3.

COMPARATIVE EXAMPLE 9B

The procedure of Example 1 is followed substituting a dry blend of 90 parts of polycarbonate (Lexan ® 141), 10 parts of GSiM impact modifier (Si-BA-S/AN wt. ratio of 35:35:30) without the styrenic network in the first stage or substrate and without the optional platinum catalyst, and 0.3 part of KSS. Properties are summarized in Table 3.

EXAMPLE 10

The procedure of Example 1 is followed substituting a dry blend of 95 parts of polycarbonate (Lexan ® 141), 5 parts of CSiM modifier ((Si/PS)-BA-S/AN wt. ratio of 35:35:30) prepared by the method of Procedure B with the optional platinum catalyst, and 0.3 part of KSS. The parts do not delaminate, and there is no surface mottling. Properties are summarized in Table 3.

Comparative Example 9A demonstrates that the presence of an MBS type rubber additive in the flame-retardant-added polycarbonate inhibits no flame resistance. Example 9 demonstrates that the addition of CSiM (Si/PS)-BA-S/AN modifier without a platinum compound to the composition somewhat improves flame-out-time over the MBS type rubber-added composition Comparative Example 9B shows surface mottling and no reduction in flammability. When compared with Examples 9 and 10, Comparative Example 9B shows poorer impact resistance indicating the benefit of using the styrenic network in the first stage substrate. Example 10 demonstrates that flame resistance and flame-out-time are markedly improved by incorporating a small amount of platinum compound within the (Si/PS)-BA-S/AN polymer modifier.

TABLE 3

| High Impact Polycarbonate/CSiM Blends | | | | |
|---|---|---|---|---|
| Example | 9 | 9A | 9B | 10 |
| Polycarbonate[1] | 90 | 90 | 90 | 95 |
| KM 653* | — | 10 | — | — |
| CSiM (No Pt)** | 10 | — | — | — |
| CSiM (Pt)*** | — | — | — | 5 |
| GSiM (No Pt)**** | — | — | 10 | — |
| KSS+ | .3 | .3 | .3 | .3 |
| Flame-Out-Time (.125") Avg. Sec. | 27 | 49 | — | 14 |
| UL-94 (.125") | Burns | Burns | Burns | V-2 |
| NI @ r.t. (ft-lbs./in.) | | | | |
| .125" | 14.3 | 9.9 | 12.8 | 15.2 |
| .250 | 11.1 | 8.7 | 10.1 | 14.3 |

[1]Lexan ® 141, poly(bisphenol-A carbonate), General Electric Company
*Acryloid ®, polybutadiene core/methyl methacrylate polymer shell, Rohm & Haas Company
**(Si/PS)-BA-S/AN wt. ratio of 35:35:30, Procedure B; without platium catalyst
***(Si/PS)-BA-S/AN wt. ratio of 35:35:30, Procedure B with platinum catalyst
****Si-BA-S/AN of wt. ratio of 35:35:30, Procedure B without the styrenic network in first stage substrate and without platinum catalyst
+Potassium salt of monosulfonated dipenylsulfone

EXAMPLE 11

A well mixed dry blend of 100 parts per hundred resin (phr) of polycarbonate (High Flow Lexan ® RL-5221), 0.05 phr of a stabilizer package, and 7.5 phr of CSiM ((Si/PS)-MMA wt. ratio of 70:30) prepared by the method of Procedure C is extruded on a Welding Engineering screw 30 mm extruder. Tensile and notched Izod bars are molded on a Boy Injection Molder. There is good rubber dispersion, good blend morphology with the modifier appearing as separate spherical particles and no agglomeration in the blend. No delamination or surface mottling are seen. Properties are summarized in Table 4.

COMPARATIVE EXAMPLE 11A

The procedure of Example 11 is followed substituting a dry blend of 100 phr of polycarbonate (High Flow Lexan ® RL-5221), 0.05 phr of a stabilizer package and 7.5 phr of an emulsion produced multi-stage MBS impact modifier whose final outer stage was prepared essentially from MMA (B-56 ® Kanegafuchi Chemical Industry Company). Properties are summarized in Table 4.

EXAMPLE 12

The procedure of Example 11 is followed substituting a dry blend of 100 phr of polycarbonate (Lexan ® 125), 0.05 phr of a stabilizer package, and 7.5 phr of CSiM ((Si/PS)-MMA wt. ratio of 70:30) prepared by the method of Procedure C. There is good rubber dispersion, good blend morphology with the modifier appearing as separate spherical particles and no agglomeration in the blend. No delamination or surface mottling are seen. Properties are summarized in Table 4.

COMPARATIVE EXAMPLE 12A

The procedure of Example 11 is followed substituting a dry blend of 100 phr of polycarbonate (Lexan ® 125), 0.05 phr of a stabilizer package, and 7.5 phr of MBS impact modifier (B-56 ®). Properties are summarized in Table 4.

Example 11 when compared with Comparative Example 11A shows that articles molded from high flow polycarbonate resins and 7.5 percent CSiM's of the present invention with a MMA outermost stage provide much higher notched Izod strengths and much better thermal stability than those modified with a butadiene/MMA core/shell impact modifier (B-56 ®).

Example 12 when compared with Comparative Example 12A demonstrates that articles molded from compositions comprising polycarbonate resins and 7.5 phr CSiM's of the present invention with a MMA outermost stage provide good gloss properties, less yellowing, better thermal stability which results in better extrusion properties, and better notched Izod strengths particularly at abusive molding conditions, as well as superior blend morphology properties.

TABLE 4

Compositions Comprising Polycarbonates and Varying Amounts of CSiM with MMA Outermost Stage

| Example | 11 | 11A | 12 | 12A |
|---|---|---|---|---|
| Polycarbonate[A] (phr) | 100 | 100 | — | — |
| Polycarbonate[B] (phr) | — | — | 100 | 100 |
| Stabilizer (phr) | 0.05 | 0.05 | 0.05 | 0.05 |
| MBS[C] (phr) | — | 7.5 | — | 7.5 |
| CSiM[D] | 7.5 | — | 7.5 | — |
| Molding Temp (°F.) | 550 | 550 | 550 | 550 |
| YI | 8.7 | 3.4 | 8.4 | 31.0 |
| Gloss (60°) | 98.7 | 95.6 | 94.6 | 91.5 |
| Notched Izod .125" ft-lbs/in. (% ductile) | | | | |
| 25° C. | 10.9 (100) | 10.9 (100) | 11.9 (100) | 11.2 (100) |
| −15° C. | 9.4 (100) | 10 (100) | 9.8 (100) | 9.5 (100) |
| −30° C. | 9.1 (100) | 10.1 (100) | — | 10.2 (100) |
| −50° C. | 8.2 (100) | 8 (40) | 9.4 (100) | 7.9 (20) |
| Molding Temp (°F.) | 670 | 670 | — | — |
| 2 mm cycle | | | | |
| YI | 42.6 | — | — | — |
| Gloss (60°) | 52.6 | — | — | — |
| Notched Izod .125" ft-lbs./in. (% ductile) | | | | |
| 25° C. | 8.2 (80) | 0.21 (0) | — | — |
| 0° C. | 6.3 (0) | — | — | — |
| −15° C. | — | — | — | — |
| −30° C. | — | — | — | — |

[A]Lexan ® RL-5221, poly(bisphenol-A carbonate), General Electric Company
[B]Lexan ® 125, poly(bisphenol-A carbonate), General Electric Company
[C]B-56 ® Kanegafuchi Chemical Industry Company
[D](Si/PS)-MMA wt. ratio of 70:30, Procedure C

EXAMPLE 13

The procedure of Example 1 is followed substituting a dry blend of 50 parts of polycarbonate (Lexan ® 141), 40 parts of saturated polyester resin (PBT) (poly(1,4-butylene terephthalate), Valox ® 315, General Electric Company) and 10 parts of CSiM modifier ((Si/PS)-S/AN wt. ratio of 70:30) prepared by the method of Procedure A. The parts do not delaminate, and there is no surface mottling. Properties results are summarized in Table 5.

EXAMPLE 14

The procedure of Example 1 is followed substituting a dry blend of 50 parts of polycarbonate (Lexan ® 141), 40 parts of poly(etherimide ester) elastomer of a modulus of approximately 10,000 psi prepared by the method of Procedure F, and 10 parts of CSiM modifier ((Si/PS)-S/AN wt. ratio of 70:30) prepared by the method of Procedure A. The parts do not delaminate, and there is no surface mottling. Properties are summarized in Table 5.

EXAMPLE 15

The procedure of Example 1 is followed substituting a dry blend of 50 parts of polycarbonate (Lexan ® 141), 20 parts of saturated polyester resin (Valox ® 315), 20 parts of poly(etherimide ester) elastomer of a modulus of approximately 10,000 psi prepared by the method of Procedure F, and 10 parts of CSiM modifier ((Si/PS)-S/AN wt. ratio of 70:30) prepared by the method of Procedure A. The parts do not delaminate, and there is no surface mottling. Properties are summarized in Table 5.

EXAMPLE 16

The procedure of Example 1 is followed substituting a dry blend of 50 parts of polycarbonate (Lexan ® 141), 40 parts of saturated polyester resin (Valox ® 315), and 10 parts of CSiM modifier ((Si/PS)-BA-S/AN wt. ratio of 35:35:30) prepared by the method of Procedure B. The parts do not delaminate, and there is no surface mottling. Properties are summarized in Table 5.

EXAMPLE 17

The procedure of Example 1 is followed substituting a dry blend of 50 parts of polycarbonate (Lexan ® 141), 40 parts of poly(etherimide ester) elastomer of a modulus of approximately 10,000 psi prepared by the method of Procedure F, and 10 parts of CSiM modifier ((Si/PS)-BA-S/AN wt. ratio of 35:35:30) prepared by the method of Procedure B. The parts do not delaminate, and there is no surface mottling. Properties are summarized in Table 5.

EXAMPLE 18

The procedure of Example 1 is followed substituting a dry blend of 50 parts of polycarbonate (Lexan ® 141), 20 parts of saturated polyester (Valox ® 315), 20 parts of poly(etherimide ester) elastomer of a modulus of approximately 10,000 psi prepared by the method of Procedure F, and 10 parts of CSiM modifier ((Si/PS)-BA-S/AN wt. ratio of 35:35:30) prepared by the method of Procedure B. The parts do not delaminate, and there is no surface mottling. Properties are summarized in Table 5.

Tough and ductile impact modified compositions having good surface appearance in accordance with this invention are obtained.

TABLE 5
Compositions of Polycarbonate, Polyester and/or Poly(etherimide ester) Elastomer and CSiM

| Example | 13 | 14 | 15 | 16 | 17 | 18 |
|---|---|---|---|---|---|---|
| Polycarbonate Resin[1] | 50 | 50 | 50 | 50 | 50 | 50 |
| Saturated Polyester (PBT)[2] | 40 | — | 20 | 40 | — | 20 |
| Poly(etherimide ester) Elastomer[3] | — | 40 | 20 | — | 40 | 20 |
| CSiM* | 10 | 10 | 10 | — | — | — |
| CSiM** | — | — | — | 10 | 10 | 10 |
| Notched Izod .125" (ft.-lbs/in) | 6.4 | 16.0 | 14.1 | 13.9 | 16.4 | 14.4 |
| Charpy NI (ft.-lbs/in) −30° C. | 1.8 | 3.8 | 2.2 | 1.9 | 2.9 | 2.8 |

[1]Lexan ® 141, poly(bisphenol-A carbonate), General Electric Company
[2]Valox ® 315, poly(1,4-butylene terephthalate), General Electric Company
[3]poly(etherimide ester) elastomer of a modulus of approximately 10,000 psi, Procedure F
*(Si/PS)-S/AN wt. ratio of 70:30, Procedure A
**(Si/PS)-BA-S/AN wt. ratio of 35:35:30, Procedure B

EXAMPLE 19

A well mixed dry blend of 54 parts of saturated polyester (Valox ® 315), 36 parts of polyphenylene ether (PPE) (epoxy functionalized) and 10 parts of CSiM ((Si/PS)-S/AN wt. ratio of 70:30) prepared by the method of Procedure A is extruded. Tensile and notched Izod bars are molded. The parts do not delaminate, and there is no surface mottling. Properties are summarized in Table 6.

EXAMPLE 20

The procedure of Example 19 is followed substituted CSiM ((Si/PS)-S wt. ratio of 70:30) prepared by the method of Procedure D for the CSiM. The parts do not delaminate, and there is no surface mottling. Properties are summarized in Table 6.

Examples 19 and 20 demonstrate the good tensile strength and ductility that CSiM modifiers can impart to PBT/PPE blended thermoplastic molded articles.

TABLE 6
Compositions Comprising Polyester, PPE and CSiM

| Example | 19 | 20 |
|---|---|---|
| Polyester[4] | 54 | 54 |
| PPE (Epoxy Functionalized) | 36 | 36 |
| CSiM[B] | 10 | — |
| CSiM[C] | — | 10 |
| Tensile Yield Strength (psi) | 6882 | 6443 |
| Tensile Break Strength (psi) | 5622 | 5944 |
| Elongation Break Strength (%) | 56 | 25 |
| Notched Izod @ 25° C. (ft.-lbs/in) | 2.7 | 3.1 |

[A]Valox ® 315, poly(1,4-butylene terephthalate), General General Electric Company
[B](Si/PS)-S/AN wt. ratio of 70:30, Procedure A
[C](Si/PS)-S wt. ratio of 70:30, Procedure D

EXAMPLE 21

The procedure of Example 19 is followed substituting a dry blend of 46 parts of saturated polyester (Valox ® 315), 30 parts of PPE (vacuum vented), 14 parts of polycarbonate (HILEX ®—General Electric Company) and 10 parts of CSiM ((Si/PS)-S/AN wt. ratio of 70:30) prepared by the method of Procedure E. The parts have a notched Izod of 1.3 ft-lbs./in. at room temperature. They do not delaminate, and there is no surface mottling.

All patents and applications mentioned above are hereby incorporated by reference.

Many variations of the present invention will suggest themselves to those skilled in this art in light of the above, detailed description. For example, polybrominated diphenyl ether can also be used to make the polyester containing compositions flame retardant. All such obvious variations are within the full scope of the appended claims.

We claim:

1. A composition comprising a polycarbonate resin (A); a mixture (A-1) comprising (i) a polycarbonate resin and (ii) a saturated polyester resin; a mixture (A-2) comprising (i) a polycarbonate resin and (iii) a poly(etherester) elastomer, a poly(etherimide ester) elastomer or a mixture thereof; a mixture (A-3) comprising (i) a polycarbonate resin, (ii) a saturated polyester resin and (iii) a poly(etherester) elastomer, a poly(etherimide ester) elastomer or a mixture thereof; a mixture (A-4) comprising (ii) a saturated polyester resin and (iv) a polyphenylene ether resin; a mixture (A-5) comprising (i) a polycarbonate resin, (ii) a saturated polyester resin and (iv) a polyphenylene ether resin; or a mixture (A-6) of any of the foregoing; and an effective modifying amount of a multi-stage polyorganosiloxane/polyvinyl-based graft polymer composition (b) comprising (a) as a first stage, a substrate selected from
  (i) a polymeric co-homopolymerized substrate comprised of, in combination, an organo-siloxane polymer and at least one vinyl-based polymer;
  (ii) a polymeric co-homopolymerized substrate comprised of, in combination, an organosiloxane polymer, at least one vinyl-based polymer, and units which are derived from a cross-linking agent or agents;
  (iii) a polymeric co-homopolymerized substrate comprised of, in combination, an organosiloxane polymer, at least one vinyl-based polymer, and units which serves as a graft-linking agent or agents;

(iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; and (b) at least one subsequent stage or stages graft polymerized in the presence of any previous stage and which is comprised of a vinyl-based polymer.

2. A composition as defined in claim 1 wherein component (A), (A-1), (A-2), (A-3), (A-4), (A-5) or (A-6) comprises from about 1 to about 99 parts by weight and component (B) comprises from about 99 to about 1 parts by weight per 100 parts by weight of (A), (A-1), (A-2), (A-3), (A-4), (A-5) or (A-6) and (B) combined.

3. A composition as defined in claim 1 wherein said organosiloxane/vinyl co-homopolymer first stage substrate (B)(a) comprises approximately 5 to 95 weight percent of the total graft polymer composition based upon the weight of said first stage and any subsequent graft stages taken together.

4. A composition as defined in claim 3 wherein said first stage substrate (B)(a) comprises approximately 30 to 90 weight percent of the total graft polymer composition.

5. A composition as defined in claim 1 wherein said first stage substrate (B)(a) is comprised of approximately 3 to 97 weight percent organosiloxane-based polymer and correspondingly approximately 97 to 3 weight percent vinyl-based polymer.

6. A composition as defined in claim 5 wherein said first stage substrate (B)(a) is comprised of approximately 5 to 45 weight percent vinyl-based polymer.

7. A composition as defined in claim 1 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is 0, 1 or 2.

8. A composition as defined in claim 1 wherein said vinyl-based polymer component of said first stage substrate (B)(a) is comprised primarily of polymerized alkenyl aromatic units, (meth)acrylate units of a mixture thereof.

9. A composition as defined in claim 8 wherein said vinyl-based polymer component comprises polystyrene.

10. A composition as defined in claim 8 wherein said vinyl-based polymer component of first stage substrate (B)(a) is comprised primarily of divinylbenzene units and other alkenyl aromatic units.

11. A composition as defined in claim 1 wherein said vinyl-based polymer in the subsequent stage (B)(b) includes monomers selected from the group consisting of alkenyl aromatic compounds, vinyl cyanide compounds, maleimide compounds, acrylamide compounds or mixtures of any of the foregoing.

12. A composition as defined in claim 11 wherein said vinyl-based polymer is selected from the group consisting of polystyrene and styrene/acrylonitrile copolymer.

13. A composition as defined in claim 1 wherein in component (B) said subsequent stages comprise (b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b)(ii) a third stage comprising at least one vinyl-based polymer which is the same as, or different than, said (b)(i) polymer.

14. A composition as defined in claim 13 wherein the ratio of first stage substrate polymer (B)(a) to second stage polymer (b)(i) is 10:90 to 90:10 by weight based upon 100 parts by weight of (B)(a) and (b)(i) combined; and the amount of third stage polymer (b)(ii) comprises from about 10 to about 90 parts by weight per 100 parts by weight of (B)(a), (b)(i), and (b)(ii) combined.

15. A composition as defined in claim 13 wherein subsequent stage (b)(i) comprises a cross-linked butyl acrylate polymer and subsequent stage (b)(ii) comprises a styrene/acrylonitrile copolymer.

16. A composition as defined in claim 1 wherein said polycarbonate resin (A), (i) or a mixture of (A) and (i) comprises the reaction product of (1) a dihydroxydiarylalkane, (2) a polyhydroxypolyarylalkane, or a mixture of (1) and (2), and (3) either (a) phosgene or (b) a diester of carbonic acid.

17. A composition as defined in claim 13 wherein said polycarbonate resin (A), (i) or a mixture of (A) and (i) comprises the reaction product of (1) a dihydroxydiarylalkane, (2) a polyhydroxypolyarylalkane, or a mixture of (1) and (2), and (3) either (a) phosgene or (b) a diester of carbonic acid.

18. A composition as defined in claim 16 wherein said multi-stage polyorganosiloxane/polyvinyl-based polymer composition has an outermost stage comprising a (meth)acrylate compound.

19. A composition as defined in claim 17 wherein said multi-stage polyorganosiloxane/polyvinyl-based polymer composition has an outer most stage comprising a (meth)acrylate compound.

20. A composition as defined in claim 16 wherein said polycarbonate resin comprises poly(bisphenol-A carbonate).

21. A composition as defined in claim 12 wherein said polycarbonate resin comprises poly(bisphenol-A carbonate).

22. A composition as defined in claim 1 wherein said saturated polyester resin (ii) comprises the reaction product of a dicarboxylic acid and a glycol.

23. A composition as defined in claim 13 wherein said saturated polyester resin (ii) comprises the reaction product of a dicarboxylic acid and a glycol.

24. A composition as defined in claim 22 wherein said saturated polyester resin (ii) comprises poly(1,4-butylene terephthalate).

25. A composition as defined in claim 33 wherein said saturated polyester resin (ii) comprises poly(1,4-butylene terephthalate).

26. A composition as defined in claim 1 wherein said elastomer (iii) comprises a block copolymer comprising (1) polyester segments and (2) polyether segments or (1) polyester segments and (3) poly(etherimide) segments.

27. A composition as defined in claim 13 wherein said elastomer (iii) comprises a block copolymer comprising (1) polyester segments and (2) polyether segments or (1) polyester segments and (3) poly(etherimide) segments.

28. A composition as defined in claim 26 wherein said polyester segments (1) comprise poly(1,4-butylene terephthalate) and said polyether segments (2) comprise a polyalkylene ether glycol, an aliphatic polyester comprising the reaction product of an aliphatic dicarboxylic acid of 2 to 12 carbon atoms and an aliphatic glycol of 2 to 10 carbon atoms, or a combination thereof.

29. A composition as defined in claim 27 wherein said polyester segments (1) comprise poly(1,4-butylene terephthalate) and said polyether segments (2) comprise a polyalkylene ether glycol, an aliphatic polyester comprising the reaction product of an aliphatic dicarboxylic acid of 2 to 12 carbon atoms and an aliphatic glycol of 2 to 10 carbon atoms, or a combination thereof.

30. A composition as defined in claim 21 wherein said polyester segments (1) comprise poly(1,4-butylene terephthalate) and said polyether segments (2) comprise a polyalkylene ether glycol.

31. A composition as defined in claim 26 wherein said poly(etherimide ester) elastomer is the reaction product of (a) one or more low molecular weight diols; (b) one or more dicarboxylic acids; and (c) one or more polyoxyalkylene diimide diacids.

32. A composition as defined in claim 27, wherein said poly(etherimide ester) elastomer is the reaction product of (a) one or more low molecular weight diols; (b) one or more dicarboxylic acids; and (c) one or more polyoxyalkylene diimide diacids.

33. A composition as defined in claim 31 wherein said polyoxyalkylene diimide diacid is derived from trimellitic anhydride and a polyoxyalkylene diamine selected from the group consisting of polypropylene oxide diamine and a copoly(ethylene oxide/propylene oxide) diamine having predominantly polyethylene oxide in the backbone.

34. A composition as defined in claim 1 wherein said polyphenylene ether resin (iv) comprises poly(2,6-dimethyl-1,4-phenylene)ether, a copolymer of (2,6-dimethyl-1,4-phenylene)ether with (2,3,6-trimethyl-1,4-phenylene)ether or a mixture thereof.

35. A composition as defined in claim 13 wherein said polyphenylene ether resin (iv) comprises poly(2,6-dimethyl-1,4-phenylene)ether, a copolymer of (2,6-dimethyl-1,4-phenylene)ether with (2,3,6-trimethyl-1,4-phenylene)ether or a mixture thereof.

36. A composition as defined in claim 12 wherein said resin in mixture (A-4) comprises (ii) a poly(1,4-butylene terephthalate) resin and (iv) a poly(2,6-dimethyl-1,4-phenylene)ether resin.

37. A composition as defined in claim 12 wherein said resin in mixture (A-5) comprises (i) a poly(bisphenol-A carbonate) resin, (ii) a poly(1,4-butylene terephthalate) resin and (iv) a poly(2,6-dimethyl-1,4-phenylene)ether resin.

38. A composition as defined in claim 1 which also includes
(C) an effective amount of a flame retardant agent.

39. A composition as defined in claims 13 which also includes
(C) an effective amount of a flame retardant agent.

40. A composition as defined in claim 38 wherein said flame retardant agent comprises platinum or a platinum compound.

41. A composition as defined in claim 39 wherein said flame retardant agent comprises platinum or a platinum compound.

42. A composition as defined in claim 1 which also includes
(D) an effective amount of a reinforcing filler.

43. A composition as defined in claim 13 which also includes
(D) an effective amount of a reinforcing filler.

44. A composition as defined in claim 1 which also includes
(C) an effective amount of a flame retardant agent; and
(D) an effective amount of a reinforcing filler.

45. A composition as defined in claim 13 which also includes
(C) an effective amount of a flame retardant agent; and
(D) an effective amount of a reinforcing filler.

46. An article molded from a resin composition as defined in claim 1.

47. An article molded from a resin composition as defined in claim 13.

48. An article extruded from a resin composition as defined in claim 1.

49. An article extruded from a resin composition defined in claim 13.

50. An article thermoformed from a resin composition as defined in claim 1.

51. An article thermoformed from a resin composition as defined in claim 13.

52. A composition as defined in claim 29 wherein said polyester segments (1) comprise poly(1,4-butylene terephthalate) and said polyether segments (2) comprise a polyalkylene ether glycol.

53. A composition as defined in claim 32 wherein said polyoxyalkylene diimide diacid is derived from trimellitic anhydride and a polyoxyalkylene diamine selected from the group consisting of polypropylene oxide diamine and a copoly(ethylene oxide/propylene oxide) diamine having predominantly polyethylene oxide in the backbone.

* * * * *